United States Patent Office 3,639,397
Patented Feb. 1, 1972

3,639,397
2-AMINO-3-AMIDINO-QUINOXALINE-DI-N-OXIDES AND THEIR PRODUCTION
Florin Seng, Cologne-Buchheim, Kurt Ley, Odenthal-Globusch, Karl-Georg Metzger, Wuppertal-Elberfeld, and Dieter Fritsche, Wuppertal-Vohwinkel, Germany, assignors to Farbenfabriken Bayer Aktiengesellschaft, Leverkusen, Germany
No Drawing. Filed July 29, 1968, Ser. No. 748,153
Claims priority, application Germany, Aug. 17, 1967, F 53,259
Int. Cl. C07d 51/78
U.S. Cl. 260—247.5 R                 8 Claims

ABSTRACT OF THE DISCLOSURE

New compounds are provided having antibacterial activity and which are 2-amino-3-amidino-quinoxaline-di-N-oxides prepared from 2-amino-3-cyano-quinoxaline-di-N-oxides as by means of reaction with piperidine. A typical compound is:

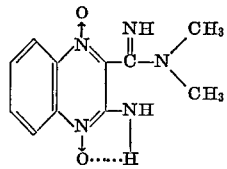

or a compound in which the benzene ring is substituted by lower alkyl, lower alkoxy or halogen. The dimethylamino group can be replaced by various heterocyclic radicals, by hydroxyalkyl, etc. The compounds are active against *E. coli, Klebsiella, S. aureus, Diplococcus pneumoniae, Proteus mirabilis, Pseudomonas aeruginosa,* etc. at a dosage of 25 to 500 mg./kg. and may be combined with usual carriers or vehicles.

---

This invention relates to new and useful antibacterial compounds active against a variety of bacteria, antibacterial compositions containing such compounds and procedure for producing the compounds by, for example, reacting piperidine with 2-amino-3-cyano-quinoxaline-di-N-oxides to form the new 2-amino-3-amidino-quinoxaline-di-N-oxides.

It has now been found that 2-amino-amidino-quinoxaline-di-N-oxides have excellent chemotherapeutic activity as antibacterial agents. These new compounds are illustrated by the following formulae:

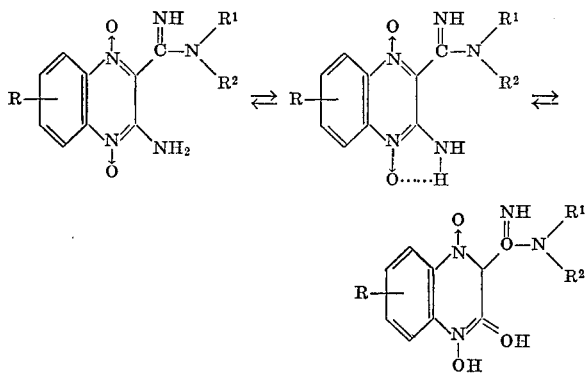

in which

R is hydrogen, lower alkyl, lower alkoxy or halogen,
$R^1$ is an aliphatic radical unsubstituted or substituted by hydroxy, alkoxy, —COO-alkyl—, mono- or dialkylamino, $R^2$ is hydrogen, —$NH_2$ or OH, and may furthermore be identical with or different from $R^1$, and, in the case where $R^1$ and $R^2$ are alkyl, these radicals, together with the nitrogen atom, may be components of a 5-, 6- or 7-membered heterocyclic ring system.

The compounds exhibit strong hydrogen bridges and may also be present, in the extreme case, in the tautomeric N-hydroxyimino form. Throughout the following the compounds are designated as 2-amino-3-amidino-quinoxaline-di-N-oxides.

The new compounds are formed by reacting 2-amino-3-cyano-quinoxaline-di-N-oxides with primary or secondary amines in an oragnic solvent.

As example the reaction with piperidine may be given:

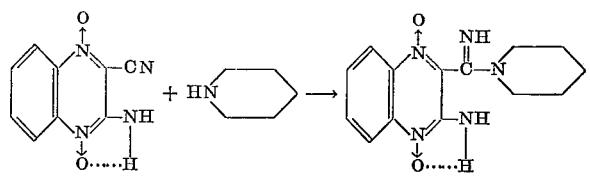

The 2-amino-3-cyano-quinoxaline-di-N-oxides used as starting compounds for the process according to the invention are obtained by reacting benzofuroxanes with malonic acid dinitrile in the presence of a catalytic amount of an amine. If, however, for this reaction stoichiometric amounts of an amine are used, then the 2-amino-3-amidino-quinoxaline-di-N-oxides are directly formed from the benzofuroxanes.

As amines used for the preparation of the chemotherapeutically active compounds the following may preferably be mentioned:

Primary or secondary amines of the formula:

wherein $R^1$ is an optionally substituted, straightchain or branched alkyl radical with 1–18, preferably 1–6, carbon atoms, and cycloalkyl radicals with 5–12, preferably 5, 6 and 7, carbon atoms in the ring system.

Substituents of the afore-mentioned aliphatic radicals are the following: hydroxy, alkoxy with 1–8, preferably 1–4, carbon atoms, —COO-alkyl with 1–4, preferably 1–2, carbon atoms, mono- or dialkylamino with 1–8, preferably 1–4, carbon atoms per alkyl group; in the case of the dialkylamino compounds the alkyl groups, together with the nitrogen atom, may be components of a 5-, 6- or 7-membered heterocyclic ring system, which in the case of the 6-membered ring, can have a double bond but where there is no double bond can have in the p-position to the nitrogen atom as further heteroatom oxygen or sulphur as well as an N-alkyl group (lower alkyl radical). Furthermore, there may also be mentioned as substituent on the aliphatic radical a phenyl radical present in the β-, γ- or ω-position. $R^2$ is hydrogen, —$NH_2$ or OH, but $R^2$ may also be identical with or different from $R^1$. In the case of alkyl, $R^1$ with $R^2$, together with the nitrogen atom, may be components of a 5-, 6- or 7-membered heterocyclic ring system which, in the case of the 6-membered ring, may be substituted in the p-position as has been mentioned for $R^1$, and in this case the alkyl radical may further be substituted by a dialkylamino group (lower alkyl radicals).

The individual preparation of the 2-amino-3-amidino-quinoxaline-di-N-oxides is carried out as follows:

One mol of a 2-amino-3-cyano-quinoxaline-di-N-oxide is suspended in an organic solvent, followed by the addition at room temperature of 1–3 mols, preferably 1.5–2 mols, of amine. Dependent upon the reactivity of the amine, the 2-amino-3-amidino-quinoxaline-di-N-oxide precipitates immediately or, after heating for some time to 30–100° C., preferably 50–80° C., in the form of crystalline compounds.

Alcohols, dimethylformamide, acetonitrile, dioxan or tetrahydrofuran are preferably used as solvents.

The exact carrying out of the process may be illustrated by the following example.

EXAMPLE 1

202 g. (1 mol of 2 - amino - 3 - cyano - quinoxaline - di - N-oxide are suspended in 1000 ml. of dimethylformamide, followed by the addition of 170 g. (2 mol) of piperidine at room temperature. The mixture is heated to 70° C. and stirred at this temperature for 1¾ hours. It is subsequently cooled to 0–5° C. and there are obtained 240 g. (83.6% of theory) of 2-amino-3-(N,N-pentamethylene-amidino)-quinoxaline-di-N-oxide in the form of yellow crystals. The compound is dissolved and recrystallized from ethanol; M.P. 192–193° C. (decomposition).

Analysis.—$C_{14}H_{17}O_2 \cdot \frac{1}{2}C_2H_5OH$ (mol weight 310). Calculated (percent): C, 58.1; H, 6.45; N, 22.6. Found (percent): C, 58.0; H, 6.5; N, 22.6.

The 2-amino-3-cyano-quinoxaline-di-N-oxide used for the reaction is obtained as follows:

13.6 g. (0.1 mol) of benzofuroxan are suspended in 150 ml. of ethanol, followed by the addition of 6.6 g. (0.1 mol) of malonic acid dinitrile. 8.5 g. (0.1 mol) of piperidine are slowly introduced dropwise. The suspended benzofuroxan dissolves and the temperature of the reaction mixture rises to 30 to 70° C., dependent upon the speed of the dropwise addition. The mixture is cooled to about +5° C. after 3 hours and, after suction filtration, there are obtained 13 g. (64.3% of theory) of 2-amino-3-cyano-quinoxaline-di-N-oxide in the form of red crystals. Melting point: 221–223° C. (from dimethylformamide).

Also the other quinoxaline derivatives used as starting compounds can be obtained in analogous manner and reacted to give the new compounds compiled in the following table (compounds Nos. 1 to 46).

| No. | Formula | React. temp. (° C.) | React. time (hours) | Decomp. point (° C.) | Color |
|---|---|---|---|---|---|
| 1 | [structure: quinoxaline-di-N-oxide with C(=NH)-NHCH₃ and NH] | 70 | 2 | 193–95 | Yellow. |
| 2 | [structure: quinoxaline-di-N-oxide with C(=NH)-NHC₂H₅ and NH] | 75 | 1.5 | 193–94 | Yellow-orange. |
| 3 | [structure: CH₃-substituted quinoxaline-di-N-oxide with C(=NH)-NHC₂H₅ and NH] | 70 | 5 | 146–48 | Yellow-brown. |
| 4 | [structure: Cl-substituted quinoxaline-di-N-oxide with C(=NH)-NHC₂H₅ and NH] | 70 | 2 | 192–93 | Brown. |
| 5 | [structure: quinoxaline-di-N-oxide with C(=NH)-NH-CH₂-CH₂-CH₃ and NH] | 80 | 1 | 183–85 | Yellow-brown. |
| 6 | [structure: Cl-substituted quinoxaline-di-N-oxide with C(=NH)-NH-CH₂-CH₂-CH₃ and NH] | 70 | 5 | 162–63 | Do. |

| No. | Formula | React. temp. (°C.) | React. time (hours) | Decomp. point (°C.) | Color |
|---|---|---|---|---|---|
| 7 | 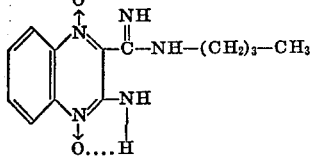 | 80 | 2 | 136–37 | Yellow-red. |
| 8 | 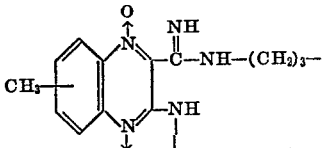 | 70 | 5 | 121–123 | Orange-red. |
| 9 | 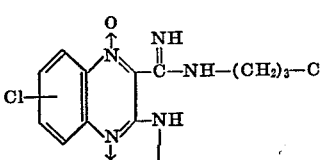 | 70 | 6 | 163–65 | Red. |
| 10 | 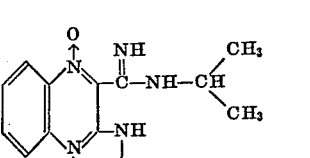 | 80 | 1.5 | 163–64 | Yellow. |
| 11 | 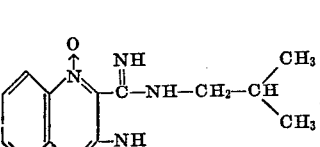 | 80 | 2 | 144–46 | Red-brown. |
| 12 | 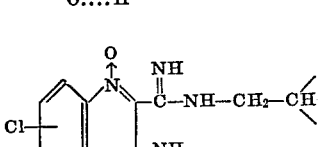 | 70 | 6 | 193–94 | Red. |
| 13 | 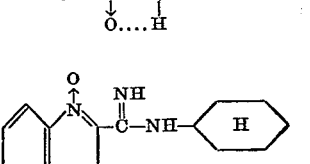 | 80 | 2 | 154–58 | Red. |
| 14 | 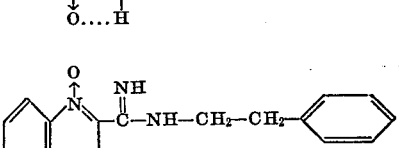 | 70 | 4.5 | 157–58 | Orange-yellow. |
| 15 | 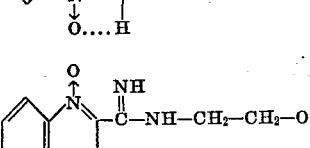 | 80 | 0.5 | 187–89 | Copper colored. |

| No. | Formula | React. temp. (°C.) | React. time (hours) | Decomp. point (°C.) | Color |
|---|---|---|---|---|---|
| 16 | quinoxaline di-N-oxide, C(=NH)–NH–CH₂–CH₂–OCH₃, NH | 75 | 5 | 146–48 | Yellow-brown. |
| 17 | quinoxaline di-N-oxide, C(=NH)–NH–CH₂–CH₂–CH₂–OH, NH | 75 | 1.25 | 180–81 | Golden-brown. |
| 18 | quinoxaline di-N-oxide, C(=NH)–NH–CH₂–CH₂–CH₂–OCH₃, NH | 70 | 3 | 158–59 | Yellow. |
| 19 | quinoxaline di-N-oxide, C(=NH)–NH–(CH₂)₃–NHCH₃, NH | 50 | 10 | 167–69 | Orange-yellow. |
| 20 | quinoxaline di-N-oxide, C(=NH)–NH–CH₂–CH₂–CH₂–N(CH₃)₂, NH | 80 | 1 | 113 | Brown-red. |
| 21 | quinoxaline di-N-oxide, C(=NH)–N(CH₃)₂, NH | 70 | 2 | 194–95 | Red. |
| 22 | 6-CH₃-quinoxaline di-N-oxide, C(=NH)–N(CH₃)₂, NH | 70 | 5 | 236–38 | Red. |
| 23 | 6-Cl-quinoxaline di-N-oxide, C(=NH)–N(CH₃)₂, NH | 70 | 4 | 193–94 | Red. |
| 24 | quinoxaline di-N-oxide, C(=NH)–N(C₂H₅)₂, NH | 80 | 3 | 173–76 | Yellow. |
| 25 | quinoxaline di-N-oxide, C(=NH)–N(CH₃)(CH₂–CH₂–OH), NH | 75 | 3 | 175–76 | Yellow-brown. |

| No. | Formula | React. temp. (° C.) | React. time (hours) | Decomp. point (° C.) | Color |
|---|---|---|---|---|---|
| 26 | quinoxaline-C(=NH)-N(CH₂-CH₂OH)₂ di-N-oxide | 75 | 7 | 157-58 | Yellow. |
| 27 | quinoxaline-C(=NH)-N(pyrrolidine) di-N-oxide | 70 | 0.25 | 183-84 | Orange-red. |
| 28 | Cl-quinoxaline-C(=NH)-N(pyrrolidine) di-N-oxide | 50 | 1. | 197-98 | Yellow. |
| 29 | quinoxaline-C(=NH)-N(piperidine) di-N-oxide | 70 | 2 | 192-93 | Do. |
| 30 | CH₃-quinoxaline-C(=NH)-N(piperidine) di-N-oxide | 80 | 0.5 | 185-87 | Do. |
| 31 | Cl-quinoxaline-C(=NH)-N(piperidine) di-N-oxide | 80 | 0.5 | (¹) | Do. |
| 32 | CH₃O-quinoxaline-C(=NH)-N(piperidine) di-N-oxide | 70 | 2 | 196-97 | Orange-red. |
| 33 | quinoxaline-C(=NH)-N(4-methylpiperidine) di-N-oxide | 70 | 2.75 | 193-94 | Yellow. |
| 34 | quinoxaline-C(=NH)-N(hexamethyleneimine) di-N-oxide | 70 | 4 | 171 | Do. |
| 35 | Cl-quinoxaline-C(=NH)-N(hexamethyleneimine) di-N-oxide | 50 | 3.5 | 197-98 | Orange-yellow. |

| No. | Formula | React. temp. (° C.) | React. time (hours) | Decomp. point (° C.) | Color |
|---|---|---|---|---|---|
| 36 | | 80 | 6 | 215-16 | Yellow. |
| 37 | | 75 | 6 | 220-22 | Do. |
| 38 | | 70 | 4 | 179 | Do. |
| 39 | | 75 | 1 | 186-87 | Orange-yellow. |
| 40 | | | 3 | 192-94 | Yellow. |
| 41 | | 25 | 2 | (³) | Yellow-red. |
| 42 | | 25 | 2 | 198-99 | Yellow. |
| 43 | | 25 | 1 | 239-41 | Orange-yellow. |
| 44 | | 25 | 2 | 235 | Yellow. |

| No. | Formula | React. temp. (° C.) | React- time (hours) | Decomp. point ° C. | Color |
|---|---|---|---|---|---|
| 45 | H₃C—[quinoxaline ring with N→O, NH, C(=O)—NHOH, NH, N→O....H substituents] | 25 | 1 | 232–33 | Yellow. |
| 46 | Cl—[quinoxaline ring with N→O, NH, C(=O)—NHOH, NH, N→O....H substituents] | 25 | 1 | 239–41 | Orange-yellow. |

¹ Burned.   ² Charred.

The new 2-amino-3-amidino-quinoxaline-di-N-oxides can be used as chemotherapeutic agents either by themselves due to their basic properties, but clearly also in the form of their pharmaceutically acceptable salts. The conversion of the bases into such salts is carried out in conventional manner with the use of physiologically acceptable acids. Examples of such salts are the following: hydrochlorides, hydrobromides, hydroiodides, nitrates, sulphates or bisulphates, phosphates or acid phosphates, acetates, lactates, citrates or acid citrates, tartrates or bitartrates, oxalates, succinates, maleates, gluconates, saccharates, methane sulphonates, ethane sulphonates, benzene sulphonates and p-toluene sulphonic acid salts.

It has already been mentioned that the novel compounds which can be obtained according to the present process have chemotherapeutic activity. Their chemotherapeutic action was tested by animal tests (orally and subcutaneously) for acute bacterial infections and in vitro. In both cases they exhibited very good antibacterial action, the range of their action including gram-negative as well as gram-positive bacteria. The compounds can be administered orally as well as parenterally. In general it has proved to be advantageous for acute common infections to administer amounts of about 25 mg. to about 500 mg., especially about 25 to about 150 mg. per kilogram of animal weight per day in order to obtain effective results. It may nevertheless be sometimes necessary to deviate from the amounts mentioned, viz. dependent upon the body weight of the test animal or the method of application, but also upon the animal species and their individual behavior towards the medicament or the type of its formulation and the time or interval at which it is administered. Thus, in some cases, smaller minimal amounts than those mentioned may be sufficient, whereas in other cases it will be necessary to exceed the upper limit mentioned. When larger amounts are administered, it may be advisable to distribute these over the day in several individual doses. For administration to humans the dosage is in about the same relative amount.

The chemotherapeutic agents may be used by themselves or in combination with pharmaceutically acceptable, non-toxic carriers. The agents may be administered in combination with various inert carriers in the form of tablets, capsules, powders, sprays, aqueous suspensions, injectable solutions, elixirs, syrups and the like. Such carriers comprise solid diluents or fillers, a sterile aqueous medium as well as various non-toxic organic solvents and the like. Tablets and the like used for oral administration can, of course, be provided with an addition of sweetening substance and the like. In the aforementioned case, the therapeutically active compound should be present at a concentration of about 0.5 to about 90 percent by weight of the total mixture, i.e. in amounts sufficient to attain the above-mentioned dosing margin.

When the tablets are orally used they may, of course, contain additives, such as sodium citrate, calcium carbonate and dicalcium phosphate together with various additive substances, such as starch, preferably potato starch, and the like and binding agents, such as polyvinyl pyrrolidone, gelatin and the like. Lubricants, such as magnesium stearate, sodium lauryl sulphate and talcum, can concurrently be used for preparing tablets. When aqueous suspensions and/or elixirs are involved which are intended for oral use, the active substance may be employed with various agents improving the taste, with dyestuffs, emulsifiers and/or suspending agents together with diluents, such as water, ethanol, propylene glycol, glycerol and similar compounds of this kind or combinations thereof.

In the case of parenteral use, solutions of the active substance can be employed in sesame or peanut oil, or in aqueous propylene glycol or N,N-dimethylformamide as well as sterile aqueous solutions of appropriate water-soluble, non-toxic, mineral-acid salts as have been mentioned above. If necessary, such aqueous solutions should be buffered in customary manner and, in addition, the liquid diluent should initially be rendered isotonic by the addition of the necessary amount of salt or glucose. Solutions of this kind are especially suitable for intravenous, intramuscular and intraperitoneal injections. Sterile aqueous media of this type are prepared in known manner.

The effectiveness of some of the compounds described can be seen from the following compilation. In the animal tests on white mice, the intraperitoneally infected animals were treated subcutaneously or orally as follows:

(1) One dose to be administered subcutaneously and per os of 1000 mg., 500 mg., 200 mg., 100 mg., 50 mg., 25.7 mg., 12.5 mg. and 6.25 mg./kg. respectively 15 minutes before or 90 minutes after infection.

(2) 2 and 3 doses respectively of 6.25 mg., 12.5 mg., 25.0 mg., 50.0 mg. and 150.0 mg./kg. respectively 2 hours before and 5 hours after infection.

(3) 4 doses of 50 mg. and 150 mg./kg. respectively 2 hours before infection, shortly before infection; 3 hours, 5 hours and/or 21 hours and 29 hours after infection.

As infection germs there were used: *E. coli*, Klebsiella, *Staphylococcus aureus*, *Diplococcus pneumoniae* respectively *Streptococcus pyogenes*, *Proteus mirabilis* and *Pseudomonas aeruginosa*. The $ED_{100}$ of the most effective compounds (i.e. 2, 3, 5, 10, 17, 21, 29) against *E. coli* C 165 is between 25 mg./kg. and 100 mg./kg. in the case of 1 dose orally or subcutaneously.

The $LD_{50}$ varies within the dosage range of about 400 mg./kg. to about 3000 mg./kg. in the case of 1 dose orally in mice. Thus, the substances are relatively non-toxic since the relatively less well tolerated compounds are distinguished by a higher activity and therefore need be applied in lower dosages only. In the treatment of rats, applying 2 doses of 60 mg./kg. per day orally over 17 days the substances were well tolerated.

In acute ascending urinary tract infections (Pyelonephritides) of rats, doses of 15 mg./kg. twice daily over 7 to 10 days were successfully used and were well tolerated.

In vitro substances exhibit bacteriostatic and bactericidal effects.

The compounds are also effective in amounts of about 5 to about 50γ per ml. against mycoplasma-infections in the in vitro test.

(1) ANIMAL TESTS ON WHITE MICE

| Substance | Dose [1] | Infection germ | Percent of surviving animals [2] |
|---|---|---|---|
| 1 | 2× 150 | E. coli | 100 |
|   | 3× 150 | Staph. aureus | 100 |
| 3 | 3× 50 | E. coli | 100 |
|   | 3× 150 | Staph. aureus | 100 |
| 5 | 2× 50 | E. coli | 80 |
|   | 4× 50 | Staph. aureus | 90 |
| 10 | 2× 50 | E. coli | 100 |
|    | 4× 50 | Staph. aureus | 100 |
| 17 | 2× 50 | E. coli | 100 |
|    | 4× 50 | Staph. aureus | 100 |
| 18 | 2× 150 | E. coli | 100 |
|    | 3× 150 | Staph. aureus | 100 |
| 20 | 4× 50 | E. coli | 90 |
|    | 4× 50 | Staph. aureus | 50 |
| 21 | 4× 50 | E. coli | 100 |
|    | 4× 100 | Staph. aureus | 100 |
| 29 | 2× 150 | E. coli | 100 |
|    | 3× 150 | Streptococcus W | 100 |
| 36 | 4× 50 | E. coli | 100 |
|    | 3× 150 | Staph. aureus | 100 |

[1] Dose=number of applications and dosage rate in mg./kg. orally according to the above schemes of treatment 1-3.
[2] 24 hrs. after infection.

(2) INHIBITION VALUES IN VITRO

| Bacterium | Minimal inhibition concentzation as μg./ml. nutrient medium | | | | | | | | | | | | |
|---|---|---|---|---|---|---|---|---|---|---|---|---|---|
|   | 1 | 3 | 5 | 10 | 17 | 18 | 20 | 21 | 29 | 30 | 31 | 36 | 41 | 44 |
| a | 12 | 6-100 | 100 | 10 | 6-100 | 100 | 100 | 12 | 50 | 100 | 5 | 100 | 100 | 50 |
| b | 3 | 100 | 100 | 50 | 25-150 |  | 100 | 6 | 12 | 100 | 5 | 100 | 100 | 50 |
| c | 6 | 100 | 100 | 10 | 25-150 |  | 100 | 6 | 50 | 100 | 100 | 100 |  |  |
| d | 100 | 100 | 150 | 150 | 150 |  |  | 150 | 150 |  |  | 100 |  |  |
| e | 100 | 100 | 100 | 100 | 50 |  |  | 150 | 100 |  | 100 | 150 |  |  |
| f |  |  |  | 25-150 | 150 |  |  | 25-150 | 50-150 |  |  |  |  |  |
| g |  |  |  | 25 | 25 |  |  |  | 50 | 100 |  |  |  |  |

Note: a=E. coli; b=Proteus sp.; c=Klebsiella sp.; d=Staph. aureus; e=Strept. pyogenes; f=Pseudomonas aerug.; g=Salmonella typhimurium.

The new 2-amino-3-amidino-chinoxalin-di-N-oxides show furthermore (same general dosage range as disclosure) activity against amoeba and flagellata (E. histolytica, Trichomonas vaginalis, Lamblia muris) both in in vitro tests and in vivo tests on animals (i.e. mice, rats, golden hamsters).

What is claimed is:

1. A 2-amino-3-amidino-quinoxaline-di-N-oxide of the formula:

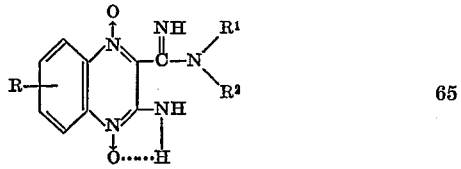

in which

R is hydrogen, lower alkyl, lower alkoxy or halogen, $R^1$ is lower alkyl or saturated or unsaturated cycloalkyl of 5, 6 or 7 carbon atoms unsubstituted or substituted by hydroxy, lower alkoxy, —COO-loweralkyl, mono- or diloweralkylamino or phenyl in the β-, γ-, or ω-position, $R^2$ is hydrogen, —$NH_2$, hydroxy or a member selected from the group consisting of lower alkyl and saturated or unsaturated cycloalkyl of 5, 6 or 7 carbon atoms unsubstituted or substituted by hydroxy, lower alkoxy, —COO-loweralkyl, mono- or diloweralkylamino or phenyl in the β, γ- or ω-position or $R^1$ and $R^2$ are both lower alkyl which together with the nitrogen atom form a 5-, 6- or 7-membered heterocyclic ring system unsubstituted or substituted by methyl, or a 6-membered heterocyclic ring system having oxygen or sulphur as a second heteroatom or N having a lower alkyl group or diloweralkyl aminoloweralkyl group attached thereto as a second heteroatom.

2. The compound of claim 1 which is

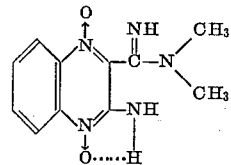

3. The compound of claim 1 which is

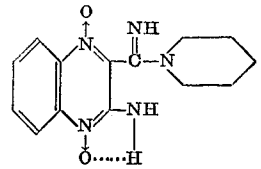

4. The compound of claim 1 which is

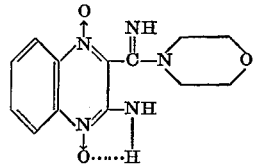

5. The compound of claim 1 which is

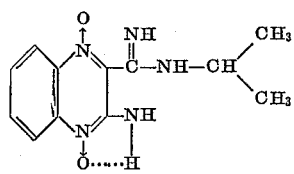

6. The compound of claim 1 which is

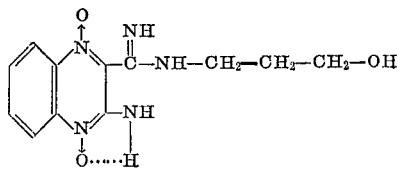

7. The compound of claim 1 which is

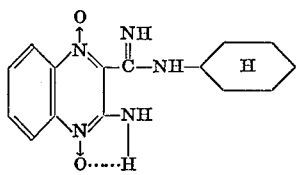

8. A process for the production of a 2-amino-3-amidino-quinoxaline-di-N-oxide of claim 1, which comprises reacting at a temperature in the range of about 30 to about 100° C. a 2-amino-3-cyano-quinoxaline-di-N-oxide of the formula:

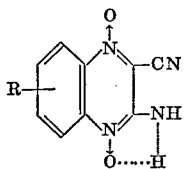

in which R is hydrogen, lower alkyl, lower alkoxy or halogen, the presence of an organic solvent, with at least the stoichiometrically required amount of an amine of the formula:

in which $R^1$ is alkyl or saturated or unsaturated cycloalkyl of 5, 6 or 7 carbon atoms unsubstituted or substituted by hydroxy, lower alkoxy, —COO-loweralkyl, mono- or diloweralkylamino or phenyl in the $\beta$-, $\gamma$- or $\omega$-position, $R^2$ is hydrogen, —$NH_2$, hydroxy or a member selected from the group consisting of alkyl and saturated or unsaturated cycloalkyl of 5, 6 or 7 carbon atoms unsubstituted or substituted by hydroxy, lower alkoxy, —COO-loweralkyl, mono- or diloweralkylamino or phenyl in the $\beta$-, $\gamma$- or $\omega$-position, or $R^1$ and $R^2$ are both lower alkyl, which together with the nitrogen atom, form a 5-, 6- or 7-membered heterocyclic ring system unsubstituted or substituted by methyl, or a 6-membered heterocyclic ring system having oxygen or sulphur as a second heteroatom or N having a lower alkyl group or diloweralkyl aminoloweralkyl group attached thereto as a second heteroatom.

References Cited

UNITED STATES PATENTS 3,366,628  1/1968  Wendt et al. _____ 260—250
3,446,809  5/1969  Marris _____ 260—250

NICHOLAS S. RIZZO, Primary Examiner

U.S. Cl. X.R.

260—250; 424—250